(12) United States Patent
Atherton

(10) Patent No.: US 7,787,533 B2
(45) Date of Patent: Aug. 31, 2010

(54) ALTERNATIVE METHOD FOR EQUALIZING DDS GENERATED WAVEFORMS

(75) Inventor: Adam T. Atherton, Cicero, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 730 days.

(21) Appl. No.: 11/619,380

(22) Filed: Jan. 3, 2007

(65) Prior Publication Data

US 2008/0159370 A1 Jul. 3, 2008

(51) Int. Cl.
*H03H 7/30* (2006.01)
(52) U.S. Cl. ...................... 375/229; 375/232
(58) Field of Classification Search ............... 375/232, 375/230, 229, 350; 708/322; 342/175, 202, 342/203
See application file for complete search history.

(56) References Cited

U.S. PATENT DOCUMENTS

| 5,999,349 A * | 12/1999 | Choi | 360/46 |
| 2005/0117243 A1* | 6/2005 | Serizawa | 360/65 |
| 2005/0207516 A1* | 9/2005 | Tonami | 375/341 |

\* cited by examiner

*Primary Examiner*—Khai Tran
(74) *Attorney, Agent, or Firm*—Daniel P. Malley; Bond, Schoeneck & King, PLLC

(57) ABSTRACT

The present invention is directed to a method for equalizing a radio frequency (RF) waveform in a communication system. The method includes generating a DDS waveform at a predetermined instantaneous frequency. A digital instantaneous frequency signal corresponding to the predetermined instantaneous frequency is provided. A predetermined digital scaling factor corresponding to the predetermined instantaneous frequency is retrieved. The DDS waveform is multiplied by the digital scaling factor to yield an equalized DDS waveform.

44 Claims, 8 Drawing Sheets

ALTERNATIVE METHOD FOR EQUALIZING DDS GENERATED WAVEFORMS

BACKGROUND OF THE INVENTION

1. Field of the Invention

The present invention relates generally to waveform generators, and particularly to waveform generators employed in DDS applications.

2. Technical Background

Direct digital synthesis is a technique that is currently used in a variety of applications to generate RF waveforms. Briefly stated, a direct digital synthesizer stores the amplitudes of a single cycle of a waveform in a digital format and reads these digital values as a function of the advancing phase to generate a digital waveform. The digital waveform is directed into a digital-to-analog converter to generate an analog waveform corresponding to the stored values. A more detailed explanation is provided below.

FIG. 1 is a block diagram of a DDS implementation 100 that may be employed in a waveform generator, local oscillator, or other such applications. A pulse control circuit provides pulse frequency data to the frequency command register 102. The frequency command register 102 is coupled in series to a phase accumulator 104. The frequency command register 102 includes registers that store control bits that function as a means for "tuning" the output signal in accordance with pre-determined signal transmission characteristics such as modulation format, frequency, bandwidth, pulse width, etc. Phase accumulator 104 is typically implemented as a free-running counter that continuously increments with each system clock signal applied thereto. The counter 104 is coupled to the address lines of phase-to-amplitude converter 106. Converter 106 is typically implemented as a look-up table (LUT). LUT 106 stores data corresponding to the amplitude of the cosine wave as a function of advancing phase. Therefore, as each memory location is read, a digital word is retrieved. The sequence of digital words read from LUT 212 corresponds to the advancing phase of a cosine wave (i.e., over the interval of 0-2π radians, i.e., 0°-360°. In many applications, the amplitude data is directed into the DAC to obtain an analog waveform. However, the digital-to-analog converter (DAC) introduces a sin(x)/x roll off distortion in the frequency domain. In conventional systems, this distortion is corrected by the inclusion of digital filter 108. This drawback is described in greater detail in FIGS. 3-5.

Referring to FIG. 2, a diagrammatic depiction of a sampled waveform output of a DAC is shown. The DAC output waveform is generated by converting the digital amplitude value provided by converter 106 into a discrete voltage value. The voltage is held for a period of time. Accordingly, the DAC outputs a "sampled" cosine waveform that exhibits discrete amplitude steps. For example, if the DAC operates at 100 MHz, waveform component 202 may be viewed as a rectangular function having a 10 nanosecond (nsec.) period and a 0.2 V amplitude. When the phase angle is at 90°, the amplitude has increased to approximately one (1.0) volt.

As those of ordinary skill in the art will appreciate, the Fourier transform of a rectangular function in the time domain is a Sinc function, i.e., sin (x)/x, in the frequency domain. FIG. 3 is a diagrammatic depiction of the frequency response of the sampled waveform shown in FIG. 2. Again, the example provided is based on a DAC having a 100 MHz sampling rate. Note that frequency response 30 experiences a severe sin (x)/x "roll-off" as the DDS frequency approaches 50 MHz. At lower frequencies, the roll-off is negligible. At point 300, the frequency is approximately 40 MHz. At point 302, the frequency is set at 50 MHz and the output is in the first null of the sin (x)/x function. To mitigate the effects of the sin (x)/x roll-off, DDS architectures typically employ a digital filter 108 that applies the inverse of sin (x)/x. FIG. 4 is a diagram of the frequency response of the inverse sin (x)/x digital filter 108 shown in FIG. 1. The object of the filter, of course, is to flatten the overall frequency response of the DDS.

However, conventional digital filter implementations have drawbacks. As those of ordinary skill in the art will understand, digital filters of the type described above are often implemented using a finite impulse response (FIR) filter. The FIR filter is used to solve a difference equation wherein the output equals the sum of a series of terms. Each term is a version of the input signal multiplied by a predetermined coefficient. If for example, the input sample is a 16-bit word and there are 19 taps in the delay chain, the filter will require 19 multiplications and additions per DAC sample. If the DAC operates at the 100 MHz sampling rate used in the previous examples, the calculations must be performed within the 10 nsec period. Accordingly, the FIR filter cannot be implemented in software and must be implemented using dedicated hardware in this example.

In the hardware implementation, the delay chain is implemented using one D-type flip-flop for each bit in the sample. In the above example, therefore, the delay 16 D-type flip-flops are required for each stage of the 19-tap filter. Further, each stage requires a multiplier and additional registers to store the tap coefficient. Finally, the products of each of the stages are added together. In one implementation, the hardware logic required to build the inverse sin (x)/x filter consumes 0.85 W. For a 3 W system, this amounts to a 30% increase in the power consumption. Of course, the increase in power consumption directly translates into an increase in the amount of heat that the system must dissipate.

Another drawback relates to the delays associated with the filter itself. In a 19-tap filter, there are, at minimum, 19 cycles of delay. If the system clock is running at 300 MHz, i.e., a 3.3 nsec clock period, the minimum delay will be almost 63 nsec.

What is needed, therefore, is an equalizer that minimizes both delay and power consumption. Further, an equalization filter having an adjustable filter response is needed. For example, an adjustable filter that is dynamically reconfigurable to pre-distort a generated waveform to account for amplitude variations in downstream RF processing would be quite desirable.

SUMMARY OF THE INVENTION

The present invention addresses the needs described above by providing an equalizer that minimizes both delay and power consumption. The present invention provides a dynamically reconfigurable filter that may be adjusted to obtain extreme frequency roll-off characteristics. The filter of the present invention may also be configured to pre-distort a generated waveform to account for amplitude variations in downstream RF processing.

One aspect of the present invention is directed to a method for equalizing a radio frequency (RF) waveform in a communication system. The method includes utilizing a DDS to generate a waveform at a predetermined instantaneous frequency. A digital instantaneous frequency signal corresponding to the predetermined instantaneous frequency is provided. A predetermined digital scaling factor corresponding to the predetermined instantaneous frequency is retrieved from a storage device. The digital waveform is multiplied by the digital scaling factor to yield an equalized digital waveform.

In another aspect, the present invention is directed to a system that includes a digital waveform generator configured to generate a DDS waveform in response to a predetermined instantaneous frequency input. A programmable equalizer is coupled to the digital waveform generator. The equalizer is configured to selectively provide a predetermined digital scaling factor in response to the predetermined instantaneous frequency input. A multiplier is coupled to the equalizer. The multiplier is configured to multiply the DDS waveform by the digital scaling factor to yield an equalized DDS waveform.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention, and together with the description serve to explain the principles and operation of the invention.

DETAILED DESCRIPTION

Figure 1:
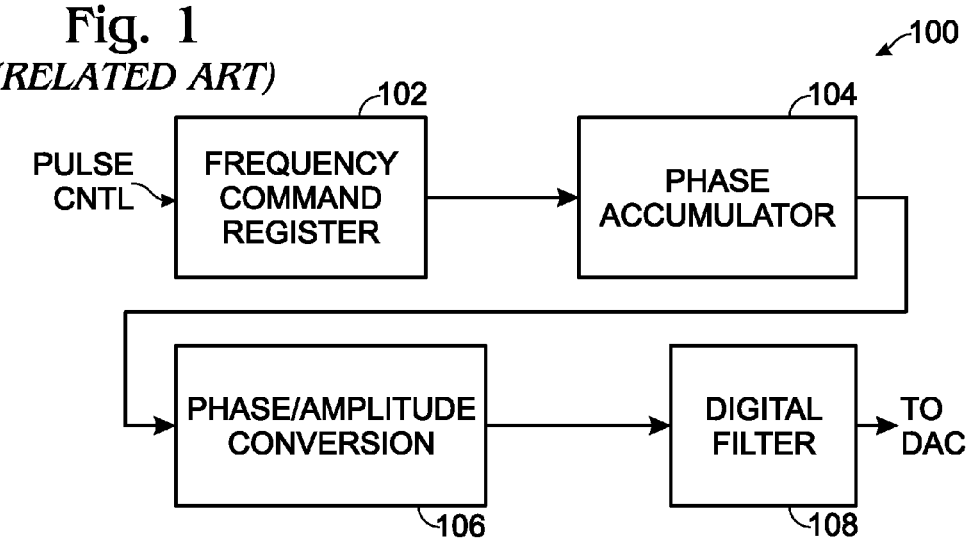
FIG. 1 is a block diagram of a digital component of a DDS based waveform generator.
Figure 2:
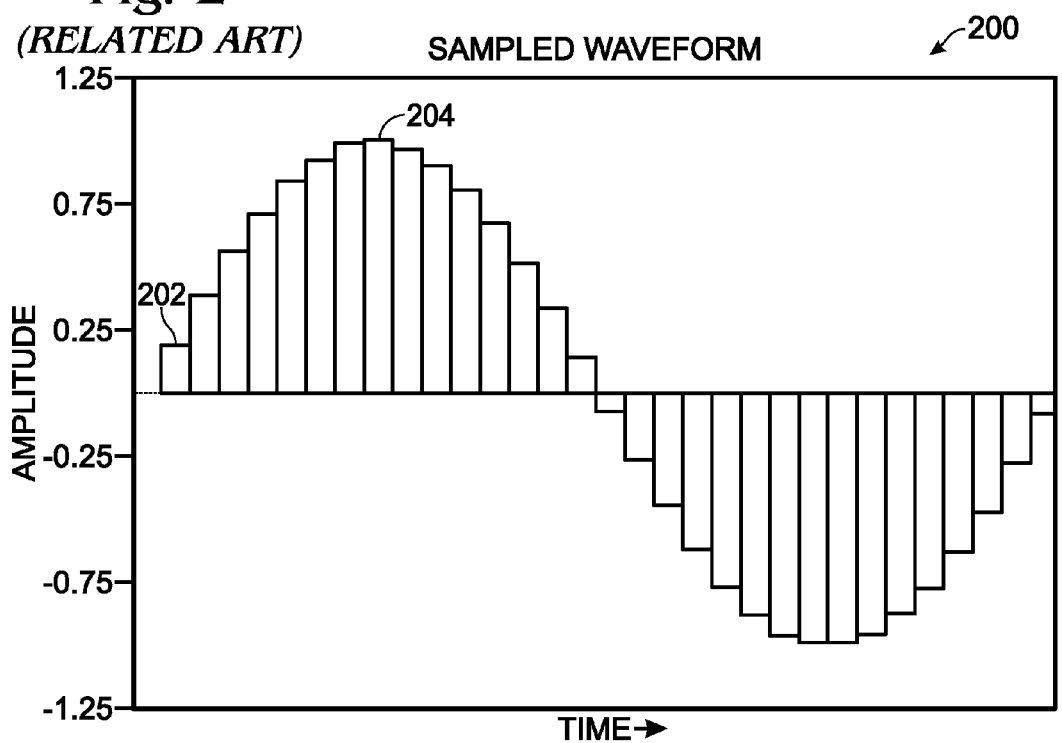
FIG. 2 is a diagrammatic depiction of sampled waveform output of a DAC.
Figure 3:
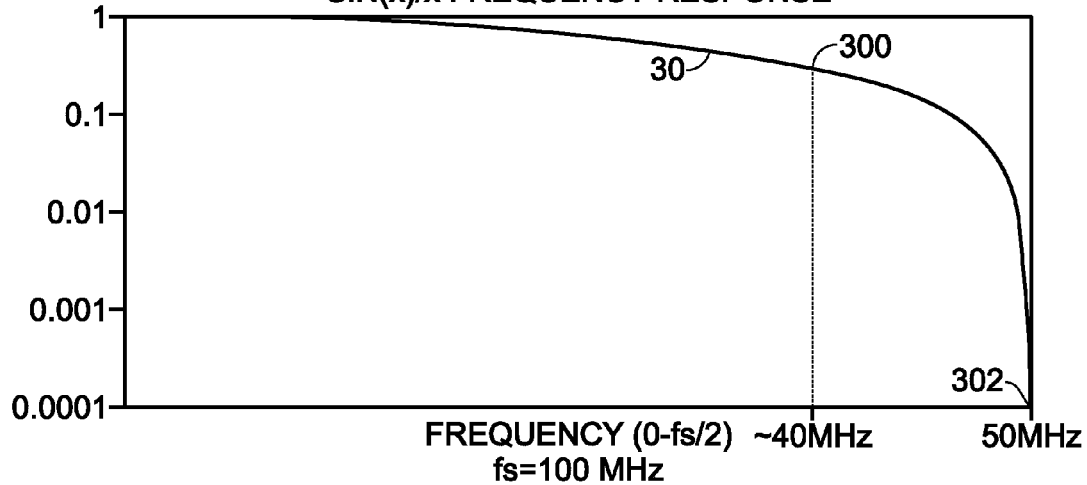
FIG. 3 is a diagrammatic depiction of the frequency response of the DAC that generates the sampled waveform shown in FIG. 2.
Figure 4:
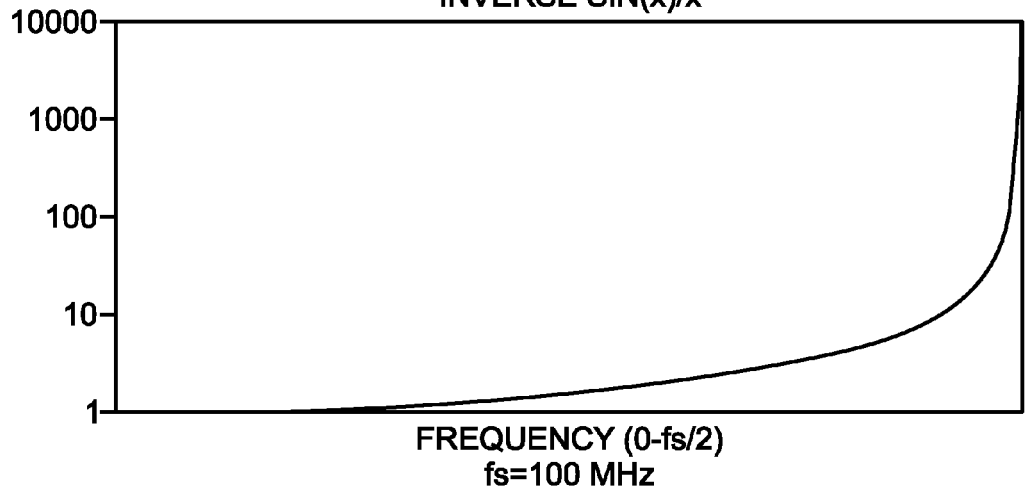
FIG. 4 is a diagrammatic depiction of the frequency response of the digital filter shown in FIG. 1.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the DDS equalizer of the present invention is shown in FIG. 5 and is designated generally throughout by reference numeral 10.

Figure 5:
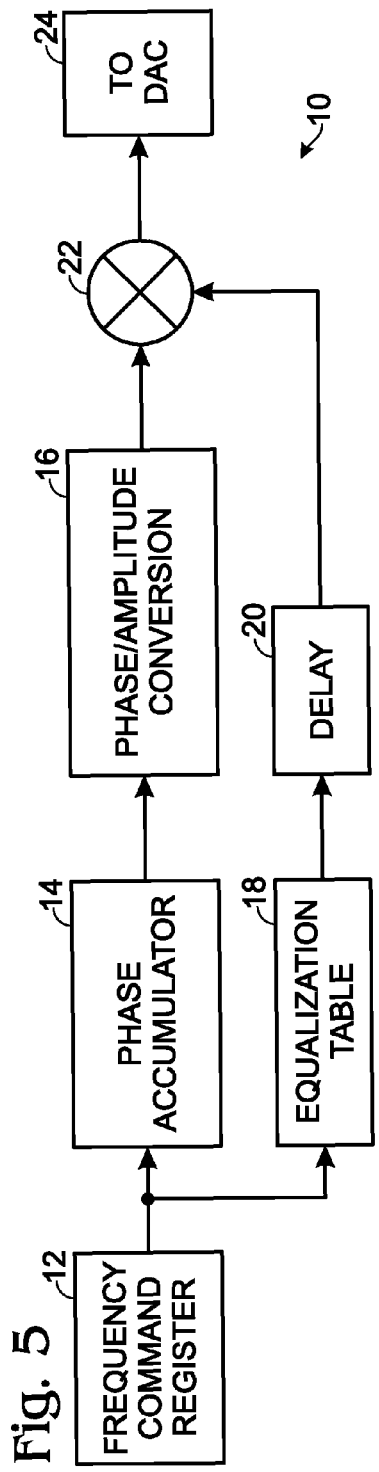
FIG. 5 is a block diagram of the DDS equalizer in accordance with one embodiment of the present invention.

As embodied herein and depicted in FIG. 5, a block diagram of the DDS equalizer (DDS/EQ) 10 in accordance with one embodiment of the present invention is shown. DDS/EQ 10 includes a frequency command register 12 coupled in series to a phase accumulator 14. The frequency command register 12 has a tuning word stored therein that provides the instantaneous frequency of the signal. The control system that drives register 12 may update and/or change the tuning word dynamically to effect any predetermined modulation format. The phase accumulator 14 provides a free-running signal, in accordance with the frequency tuning word, that continuously increments with each system clock signal applied thereto. Phase accumulator 14 is coupled to phase-to-amplitude converter 16.

The phase-to-amplitude converter 16 is a look-up-table (LUT) and includes data corresponding to the amplitude of the cosine wave as a function of advancing phase. Each memory location includes an amplitude value that corresponds to a phase value. Therefore, as each phase value generated by phase accumulator 14 is presented to LUT 16, a digital amplitude corresponding to the phase is retrieved. Thus, the sequence of digital words read from LUT 16 corresponds to the advancing phase of a cosine wave (i.e., over the interval of 0-2π radians, i.e., 0°-360°). The digital signals provided by the phase accumulator 14 may include any suitable number of bits, such as 8, 12, 16, 24, 32, etc. The amplitude data is directed into multiplier 22 where it is modified by the equalization and delay table (18, 20).

Output equalizer 18 is implemented as a look-up-table (LUT). The instantaneous frequency is used as the input to the equalizer LUT 18. As those of ordinary skill in the art understand, an equalizer compensates for frequency dependent attenuation and/or distortion. Each frequency component of the signal, as represented by the instantaneous frequency stored in frequency command register 12, may be individually adjusted in accordance with a predetermined filter transfer function. The digital filter transfer function stored in LUT 18, for example, may be configured to pre-distort the generated waveform to substantially eliminate analog distortions induced by RF components downstream of the DAC. The digital filter transfer function may implement an inverse sin (x)/x function to mitigate the effects of the sin (x)/x roll-off. In fact, any conceivable filter transfer function may be stored in LUT 18. In any event, equalization LUT 18 provides a frequency dependent scaling factor. The scaling factor and the amplitude output of element 16 are multiplied by multiplier 22 to provide an equalized output to the DAC.

It should be noted that a separate delay element 20 is shown as being coupled to the output of equalization table 18. In fact, the delay element 20 is typically, but does not have to be, incorporated as part of equalization table 18. The delay element 20 is employed to account for the signal propagation delays in the phase accumulator 14 and phase-to-amplitude converter 16.

The arrangement depicted in FIG. 5 may be employed in any number of applications including, but not limited to, agile LO frequency synthesis, programmable clock generators, FM chirp sources for radar and scanning systems, automotive radar systems, test and measurement equipment, acousto-optic device drivers, commercial and amateur RF exciters, and ultrasound waveform generators. Again, the present invention should not be construed as being limited to the applications listed above.

Figure 6:
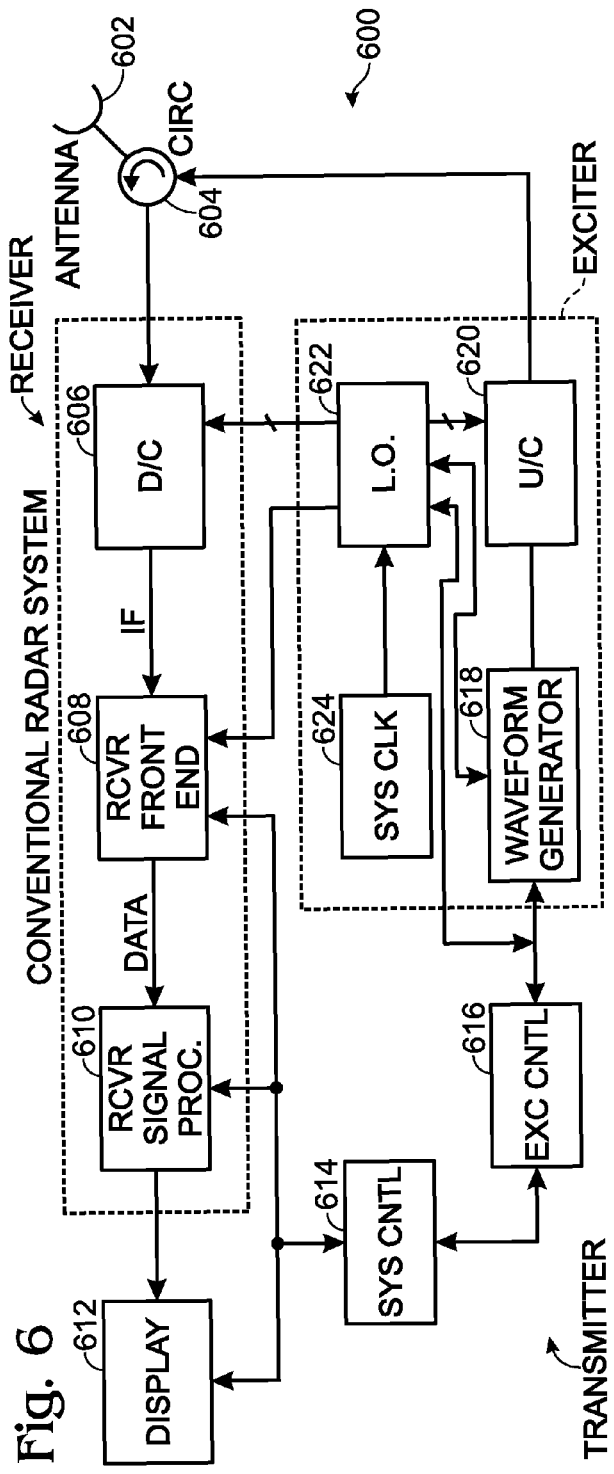
FIG. 6 is a simplified block diagram of a radar system in accordance with the present invention.
Figure 7:
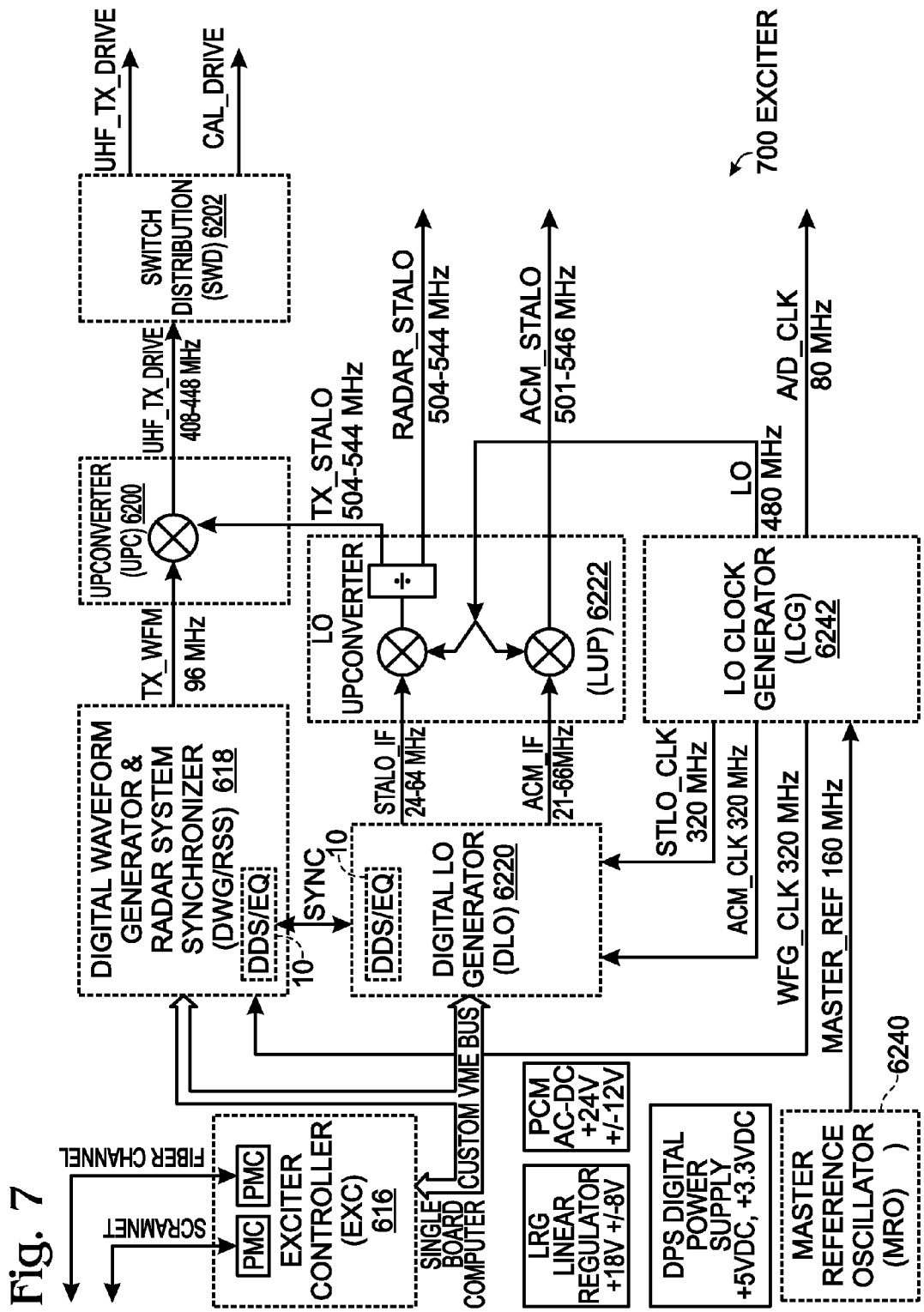
FIG. 7 is a high level block diagram of the exciter depicted in FIG. 6.
Figure 8:
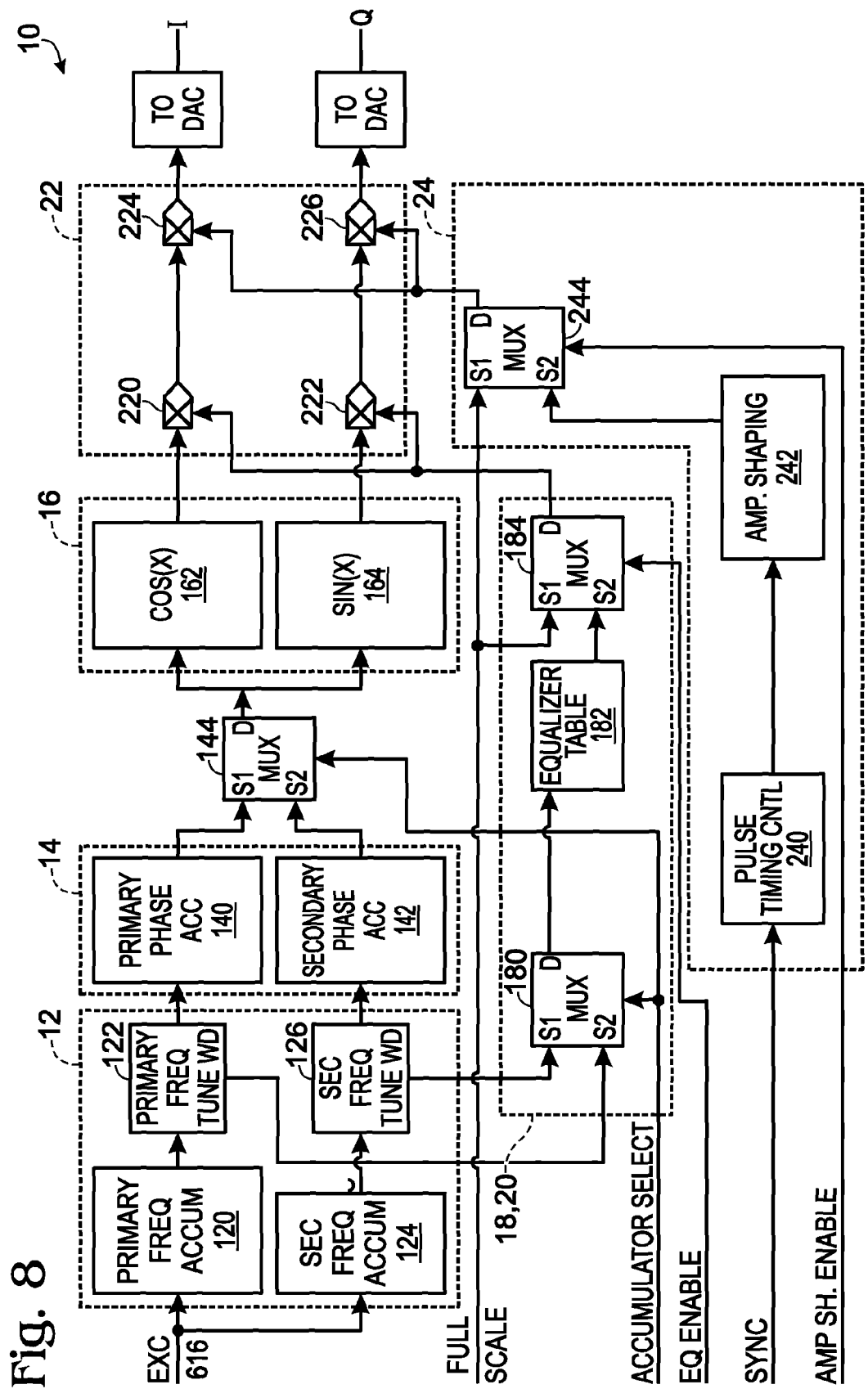
FIG. 8 is a detailed block diagram of the DDS equalizer employed in the digital waveform generator (DWG) and digital local oscillator (DLO) circuits shown in FIG. 7.

FIGS. 6-8 are directed to a radar system that applies the DDS/EQ 10 of the present invention. FIG. 6 is a simplified block diagram of radar system 600 and is provided herein to provide context to the discussion. FIG. 7 is directed to a diagram of the radar exciter shown in FIG. 6. FIG. 8 is a detailed block diagram of the DDS equalizer of the present invention as applied to the radar/exciter arrangements depicted in FIGS. 6-7. By way of introduction, the term "radar" is an acronym for the phrase "radio detection and ranging." A radar transmits RF energy and "listens" for reflected return signals to detect a target and determine a target's location in space. The range is determined by what is commonly referred to in the art as the "radar equation." When the radar is disposed on a moving platform, such as a ship or an aircraft, target location may be provided as a relative bearing or a true bearing. The relative bearing is the angle of the target relative to the platform's heading, whereas a true bearing is referenced from true north, i.e., it is the sum of the platform's heading and the target angle. If the target is airborne, the target altitude is obtained by multiplying the target range by the sine of the target's elevation angle. The target range is a function of the transmitted power, the received power, the antenna gain, the wavelength of the electromagnetic energy, the radar cross-section of the target and the time delay between the transmitted.

A high-level block diagram of a radar system 600 in accordance with the present invention is shown in FIG. 1. Radar system 600 includes an antenna 602 coupled to circulator 604. The circulator 604 is coupled to the receiver by way of a downconverter 606. Downconverter 606 is coupled to receiver front-end 608. The downconverter 606 amplifies and demodulates the incident reflected RF signal. Demodulation refers to the process of multiplying the received amplified signal by a LO reference signal to generate an analog signal characterized by a lower intermediate frequency (IF). The conversion from RF to IF is performed because IF signals are, in general, easier to process that are RF signals. In any event, the IF signal is converted into digital data by receiver front-end 608. The digital data may be in a single bit stream format or may employ complex signals that include in-phase and quadrature (I, Q) data signals. In any event, the receiver signal processor 610 correlates the received signal data with the transmitted signal to determine whether the data represents a legitimate target. The receiver signal processor 610 may perform many sophisticated calculations to distinguish a legitimate target echo from noise and background clutter. Doppler filtering may be employed to determine a target's velocity. Display 612 provides the processed data to the user in a user-recognizable format.

The transmitter is coupled to circulator 604 via the upconverter 620. Upconverter 620 is a part of the radar exciter, which also includes waveform generator 618, system clock 624, and local oscillator 622. The exciter is driven by exciter controller 616. The exciter controller is coupled to the system control circuitry 614, which also controls receiver elements such as receiver front-end 608, signal processor 610, and display 612.

The exciter controller 616 is a processor that receives and interprets commands from the system controller 614. Exciter controller 616 provides instructions to both the local oscillator 622 and waveform generator 618 related to signal bandwidth, pulse timing, and other such signal characteristics. Waveform generator 618 provides a pulse, or a series of pulses, to upconverter 620 in response to exciter controller 616 command signals. Upconverter 620 modulates the pulses by multiplying them by an LO reference signal to generate RF pulses. Circulator 604 is typically a ferrite device that directs RF transmit signals to antenna 12 and directs RF receive signals from the antenna into the receiver. Antenna 12 radiates the RF signal into a predetermined coverage volume in accordance with the antenna design parameters. If there is a target disposed in the coverage volume, the radiated RF signal should be reflected by the target. A small portion of the reflected signal is captured by the antenna and directed into the receiver 18 via circulator 14.

Local oscillator 622 provides the transmitter and the receiver with stable coherent local oscillator (LO) reference signals. The operation of radar 600 is controlled by a system control unit 614. One important function of system control 614 relates to the synchronization of the transmitter and receiver functions. This function requires stable coherent LO reference signals.

Referring to FIG. 7, a block diagram of the exciter 700 in accordance with one embodiment of the present invention is disclosed. EXC 164 is coupled to a system controller 24. EXC 616 is coupled to DWG 618 and digital local oscillator 6220 by way of a VME bus. The modulation format, frequency data, pulse width data, signal bandwidth and other such radar transmission characteristics are transmitted to DWG 618 and DLO 6220 from EXC 616 based on system level commands from system controller 614. An embodiment of the DDS/EQ 10 of the present invention (See FIG. 8) is disposed in both DWG 618 and DLO 6220. The DDS/EQ 10 in DWG 618 is coupled to the DDS/EQ in DLO 6220 by way of synchronization signal 100. Note that DWG 618 generates the pulses, whereas DLO 200 controls the tuning frequency. The synchronization signal ensures that the two units work together such that a given pulse is transmitted at the proper frequency, as determined by EXC 616 and the system controller 614.

DLO 6220 provides LUP 6222 with intermediate frequency (IF) signals, such as STALO_IF and ACM_IF, in the frequency range between 24-64 MHz. STALO_IF is multiplied by LUP 6222 to provide the upconverter assembly 6200 with a stable and agile transmitter local oscillator signal (TX_STALO). LUP 6222 also provides local oscillator signals to the receiver downconverter 606 (See FIG. 6). DWG 618 supplies a transmit waveform (TX_WFM) to the upconverter 6200. The upconverter 6200 multiplies TX_WFM by the TX_STALO to provide a UHF transmitter drive signal (UHF_TX_DRIVE). The UHF_TX_DRIVE signal is a low power (i.e., ≈1 W) version of the radar output signal.

The radar output is directed into switch distribution device (SWD) 6202. SWD 6202 is configured to switch the radar output into one of two output paths. The first output is coupled to transmitter amplifiers and the radar antenna. The remaining output is connected to the inputs of the radar calibration facilities.

Exciter 700 receives the various clock signals from system clock 624. As shown in FIG. 7, system clock 624 includes a master reference oscillator (MRO) 6240 coupled to an LO clock Generator circuit (LCG) 6242. MRO 220 may be implemented by a crystal oscillator device. The MRO 220 provides a 160 MHz master clock signal to LO clock generator (LCG) 222. LCG 222 utilizes this 160 MHz master clock signal to generate clocks for the system including A/D clocks for the receiver, 320 MHz clocks for the DLO 6220 and DWG 618, and 480 MHz LO up-conversion clocks to the LUP 6222.

As embodied herein and depicted in FIG. 8, a DDS/EQ 10 in accordance with another embodiment of the present invention is disclosed. It will be apparent to those of ordinary skill in the pertinent art that modifications and variations can be made to DDS/EQ 10 of the present invention depending on the implementation of the circuit architecture. For example, DDS/EQ 10 may be implemented as an integrated device such as a field programmable gate array (FPGA), an application specific integrated circuit (ASIC) or as a customized integrated circuit. In addition, DDS/EQ 10 may be implemented as a software routine running on a processor connected to a Digital to Analog Converter (DAC).

Referring to FIG. 8, the structure of the DDS/EQ 10 is similar, if not more detailed, than the DDS/EQ structure shown in FIG. 5. EXC is coupled to frequency accumulator block 12. The frequency accumulator block 12 is coupled to the phase accumulator block 14. As in the previous embodiment (FIG. 5), the phase accumulator block 14 provides phase data to the phase-to-amplitude converter section 16. The digital amplitude values are first multiplied (220, 222) by equalizer scaling values provided by the equalizer/delay block (18, 20). The equalized amplitudes are subsequently multiplied (224, 226) by amplitude shaping scaling values provided by amplitude scaling block 24. The modified amplitude values are directed to the DACs.

Referring back to the frequency accumulator section 12 in more detail, EXC 616 provides frequency "tuning" words to a primary frequency accumulator 120 and a secondary frequency accumulator 124. The primary frequency accumulator provides register 122 with a primary frequency tuning word, and the secondary frequency accumulator provides register 126 with a secondary frequency tuning word. The frequency tune word depends on the predetermined characteristics of the transmitted RF signal pulses. The frequency accumulators are configured to sequence through a predetermined modulation sequence under EXC 6161 command. Thus, a sequence of tuning words may be employed to implement any type of modulation format such as amplitude modulation, frequency modulation, and/or phase modulation. Of course, the aforementioned modulation formats include non-linear frequency modulation (NLFM), linear frequency modulation (LFM), binary phase shift keying (BPSK), frequency shift keying (FSK), as well as other formats.

The primary frequency accumulator 120 is coupled in series to the primary phase accumulator 140. In similar fashion, a secondary frequency accumulator 124 may be coupled in series with a corresponding secondary phase accumulator 142. The primary phase accumulator 140 and the secondary phase accumulator 142 are free-running signals that continuously increment with each system clock signal applied thereto. The output of primary phase accumulator 140 and the output of the secondary phase accumulator 142 are coupled to the inputs of multiplexer switch 144. The control input to switch 144 determines which digital phase signal is provided to cosine look-up table (LUT) 162 and sine LUT 164. The use of a primary channel and a secondary channel allows the system to switch between frequency signals rather easily, i.e., by changing the control input to multiplexer 144. The digital signals provided by the phase accumulators may include any suitable number of bits, such as 8, 12, 16, 24, 32, etc.

LUT 162 is a memory device that stores data corresponding to the amplitude of the cosine wave as a function of advancing phase. Therefore, as each memory location is read, a digital word is retrieved. The sequence of digital words read from LUT 162 corresponds to the advancing phase of a cosine wave (i.e., over the interval of 0-2π radians, i.e., 0°-360°). Similarly, LUT 164 includes data corresponding to the amplitude of a sine wave as a function of phase. Thus, the phase signal provided by multiplexer 144 is employed as the address input to each LUT (162, 164). The selected phase accumulator, as noted above, is implemented as a counter, and is configured to cycle through the LUT addresses. Each of the N+1 series combinations of frequency and phase accumulators is configured to cycle through the memories at a different rate—the rate being determinative of the frequency.

Those of ordinary skill in the art will also note that the cosine LUT 162 provides the in-phase (I) component of a complex signal, whereas the sine LUT 164 provides the quadrature (Q) component of the complex signal. Those of ordinary skill in the art will further understand that in its trigonometric form, a complex signal may be expressed as: $c=M[\cos(\Phi)+j\sin(\Phi)]$, with M being the magnitude of the complex signal. Quadrature signals are often used in digital communications and radar applications because of the many advantages quadrature sampling provides in the receiver. For example, quadrature sampling techniques are often used to derive the instantaneous magnitude and phase of a signal during demodulation. In some system implementations, the receiver must be able to derive phase information if it is to perform coherent signal processing. The "I-data" and the "Q-data" are provided to their respective digital-to-analog converters (DAC) after being conditioned by DWG equalizer and amplitude shaping block 24. Quadrature systems provide an improved SNR because I-data and Q-data add coherently, whereas noise does not.

In addition to providing frequency "tuning" words to both the primary frequency accumulator 202 and secondary frequency accumulators 206, EXC 164 is also coupled to multiplexer 180 in the equalizer 18. Multiplexer 180 is employed to select between either the primary instantaneous frequency or the secondary instantaneous frequency in accordance with the accumulator select signal. Note that the accumulator select signal is also is used to control multiplexer 144. The instantaneous frequency is provided to equalizer 182. Output equalizer 182 is implemented as a look-up-table (LUT). EQ LUT 182 is coupled to the input of multiplexer 184. The other input to multiplexer 184 is the "full scale" value, i.e., the instantaneous frequency value without equalization. The selection of the equalized output and the non-equalized output is performed by the equalizer enable signal that is provided by EXC 616. The output of multiplexer 184 is directed to multiplier 220 and multiplier 222. The output of the cosine LUT (162) and the sine LUT (164) is multiplied by a frequency dependent equalization value.

Equalizer 18 must incorporate a delay to ensure that the equalization scaling factor applied at multiplier 220 and 222 arrives at the same time as the corresponding waveform sample. In other words, a delay that takes into account the pipeline delay of the phase accumulator and phase/amplitude conversions must be added to match the equalizing scale factors to the correct waveform sample. This delay is realized by addressing EQ LUT 182 appropriately.

DDS/EQ 10 of the present invention may also include amplitude shaping circuit 24. Those of ordinary skill in the art will understand that an output pulse having a rise time that is characterized by an infinite slope may damage the RF amplifiers downstream and generate ripples in the frequency spectrum effecting compliance with FCC or NTIA emissions requirements. The amplitude shaping circuit 24 is used to introduce a more gradual slope also used control these emissions to prevent the output pulse from bleeding into adjacent frequency channels. Accordingly, it is desirable to control the rise time of the pulse. The output of the amplitude shaping circuit 24 is directed into multiplier 224 and multiplier 226 by way of multiplexer 244. Like the equalization circuit, multiplexer 244 has a "full scale" input that disables any amplitude shaping. As noted previously, equalizer LUT 182 compensates for frequency dependent attenuation and/or distortion. Each frequency component of the signal may be individually adjusted in accordance with a predetermined filter transfer function.

Furthermore, system controller 614 and/or EXC 616 may be configured to dynamically compute new values and repopulate LUT 182 in accordance with changing system requirements. For example, RF power levels may be measured at the output of the SWD 6202 module shown in FIG. 7. System controller 614 may change the digital filter transfer function in response to said RF power level measurements. Because LUT 182 is programmable, any number of equalization coefficient sets may be computed and stored therein. Accordingly, "pre-distortion" may be applied to the waveform to compensate for downstream distortion, such as RF filter roll-off, and/or amplifier non-linearities. Those of ordinary skill in the art will understand that the granularity of the waveform equalization depends on the size of the LUT storing the scaling factors. As shown in greater detail below, the present invention may be used to implement filter transfer functions that cannot be realized using the current state of the art digital filter techniques.

Figure 9:
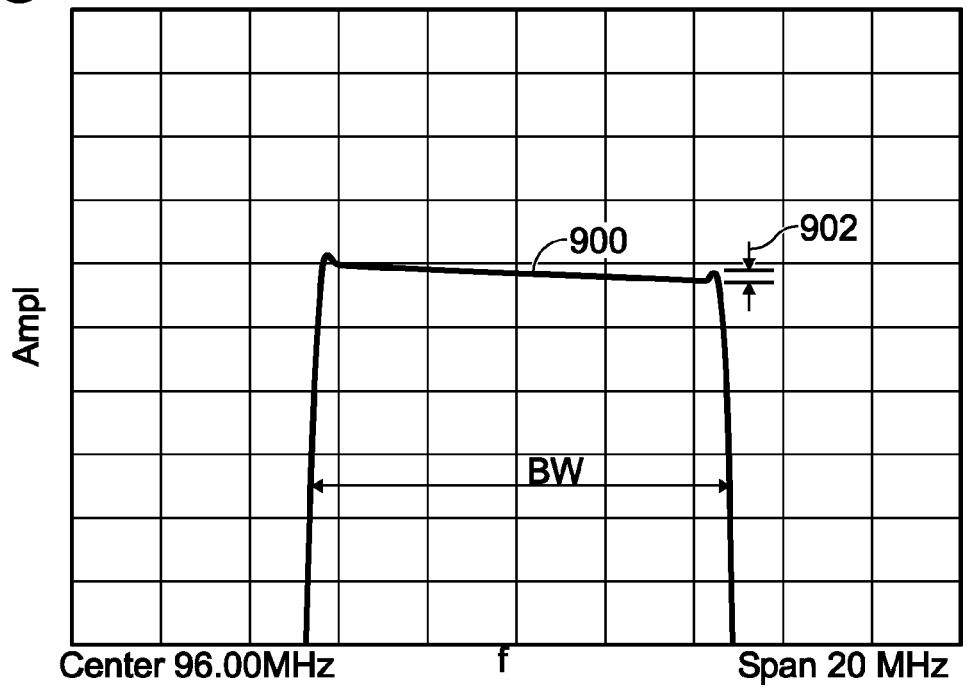
FIG. 9 is an output spectrum of an unequalized LFM waveform.

FIG. 9 is an output spectrum of an unequalized LFM waveform. This corresponds to a scenario wherein the "full scale" equalizer input is selected, i.e., the equalization filter of the present invention is not applied. The sample rate of the DAC in this implementation is 300 MHz. The transmitter is configured to output an LFM chirp. The horizontal scale is divided into 2 MHz increments whereas the vertical scale is divided into 1 dB increments. The LFM chirp includes instantaneous frequencies between 91-101 MHz, thus, the spectrum 900 has a bandwidth of approximately 10 MHz. As noted previously, the sin (x)/x roll off increases as the chirp frequency increases. The first null of the sin (x)/x function is expected at 150 MHz. In this case, when the instantaneous frequency approaches 101 MHz, the loss 902 is almost 0.5 dB.

FIGS. 10-14 illustrate the power and capabilities of the present invention. All of the initial conditions described above apply to these equalization filter examples.

Figure 10:
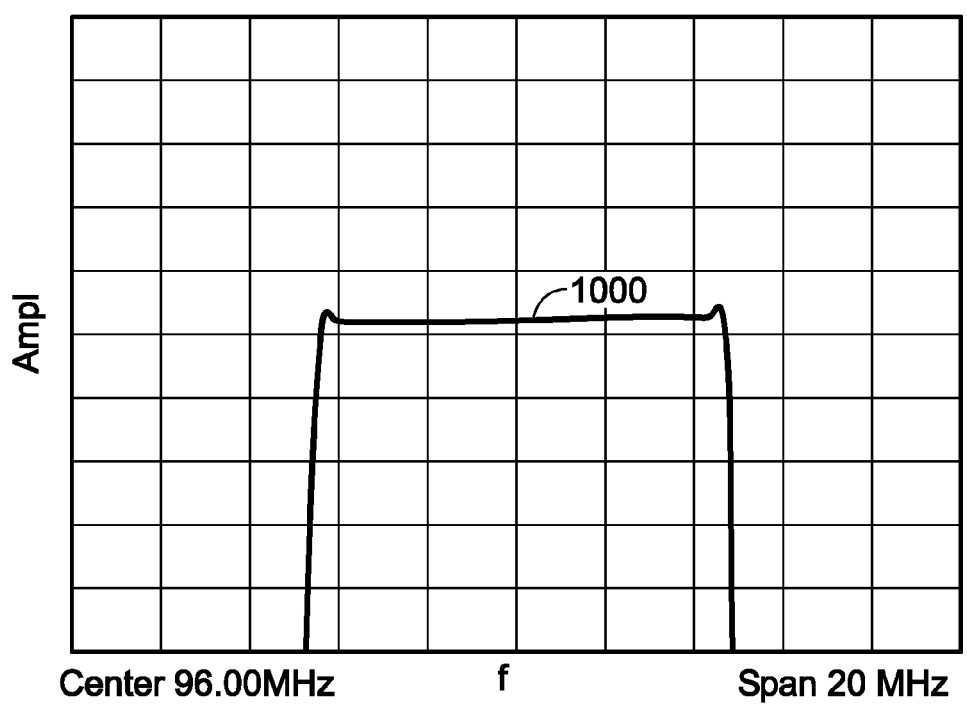
FIG. 10 is an output spectrum of the same waveform as shown in FIG. 9 utilizing the ideal equalization filter implementation in accordance with the present invention to maximize flatness.

FIG. 10 is an output spectrum of the same waveform as shown in FIG. 9 utilizing the ideal equalization filter implementation in accordance with the present invention to maximize flatness. Output spectrum 1000 illustrates the performance of an equalization filter implementing the inverse sin (x)/x filter in accordance with the present invention. Again, the sample rate of the DAC in this implementation is 300 MHz. The transmitter is configured to output the LFM chirp discussed above. The horizontal scale is divided into 2 MHz increments whereas the vertical scale is divided into 1 dB increments. The LFM chirp includes instantaneous frequencies between 91-101 MHz. As shown, the equalized output spectrum 1000 exhibits very little, if any, sin (x)/x roll-off and is uniformly flat.

Figure 11:
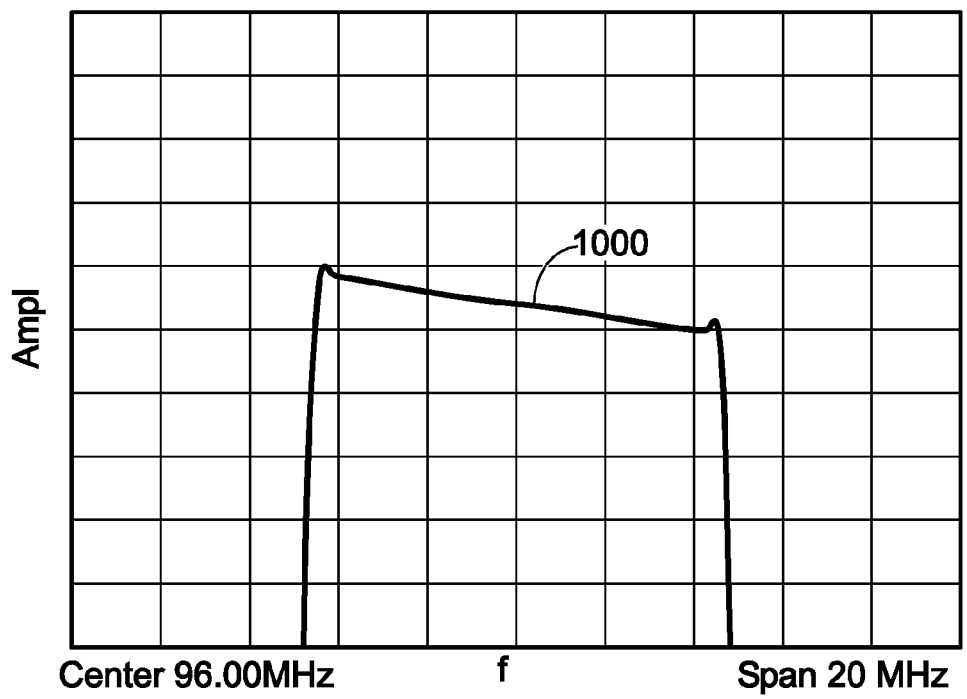
FIG. 11 is an output spectrum of a filter implementation designed to enhance the sin(x)/x roll-off applied to the waveform shown in FIG. 9 in accordance with the present invention.
Figure 12:
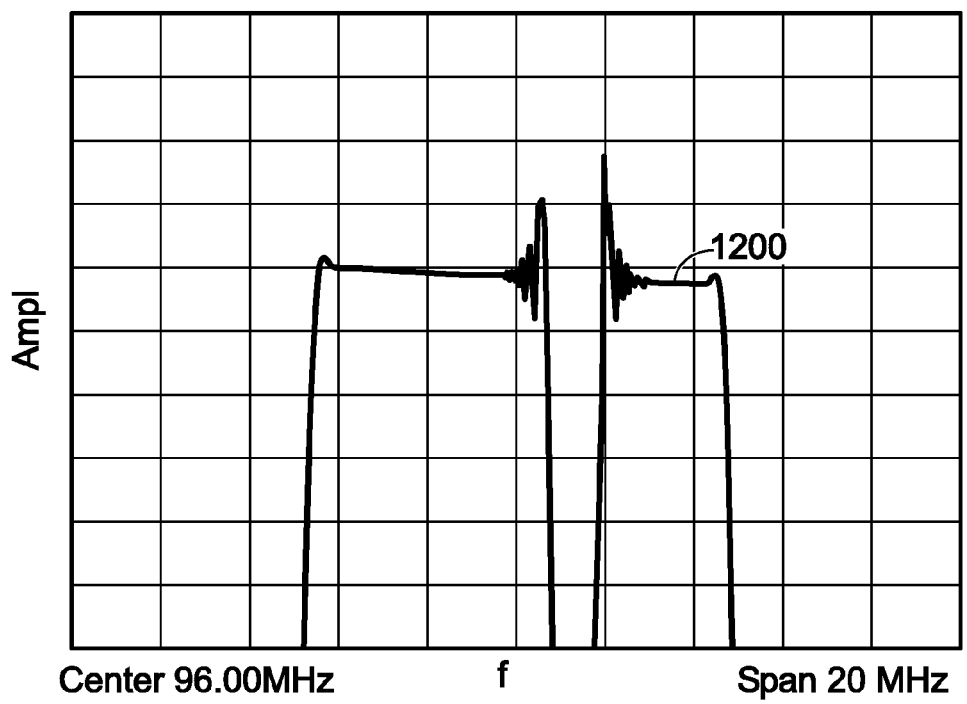
FIG. 12 is an output spectrum of a notch filter implementation applied to the waveform shown in FIG. 9 in accordance with the present invention.
Figure 13:
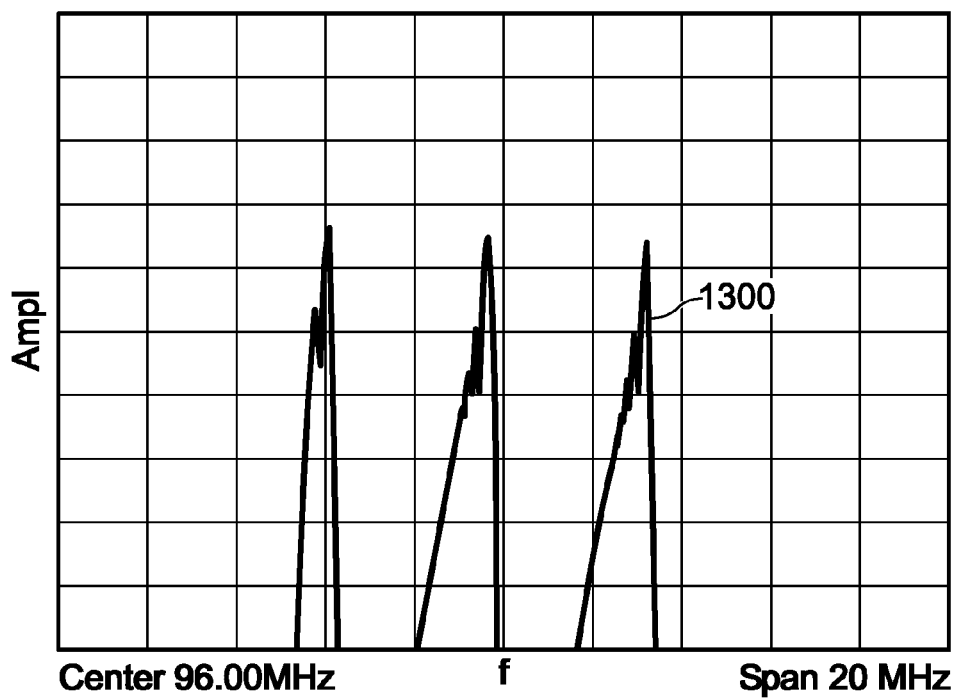
FIG. 13 is an output spectrum of a sawtooth filter implementation applied to the waveform shown in FIG. 9 in accordance with the present invention.
Figure 14:
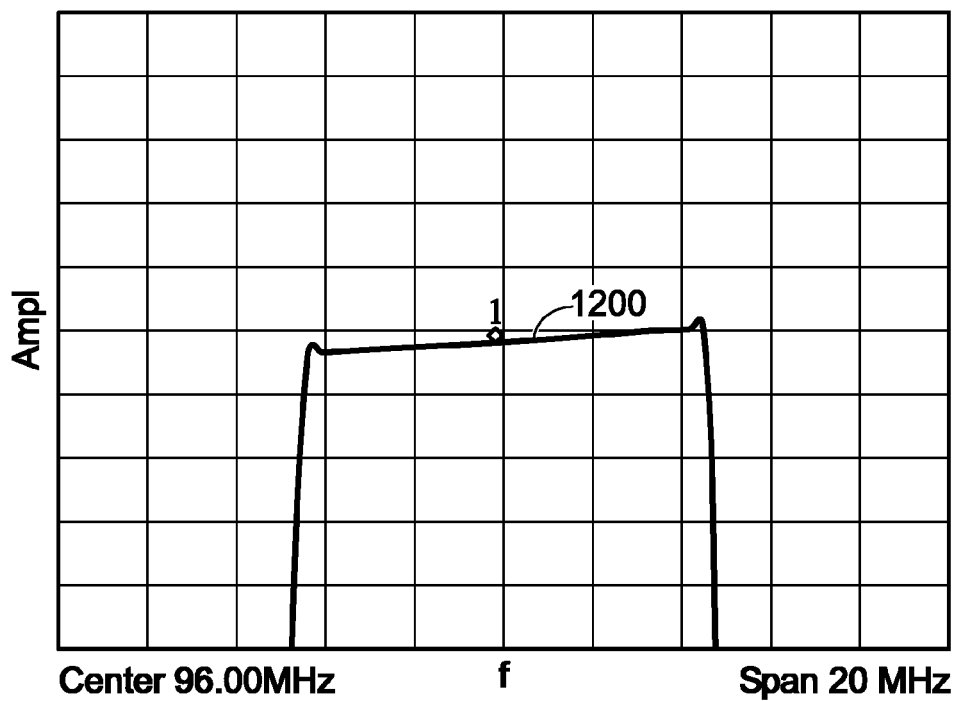
FIG. 14 is an output spectrum of a filter designed to invert the sin(x)/x roll-off applied to the waveform shown in FIG. 9 in accordance with the present invention.

FIG. 11 is an output spectrum of a filter implementation designed to enhance the sin(x)/x roll-off applied to the waveform shown in FIG. 9. FIG. 12 is an output spectrum of a notch filter implementation applied to the waveform shown in FIG. 9. FIG. 13 is an output spectrum of a sawtooth filter implementation applied to the waveform shown in FIG. 9. Those of ordinary skill in the art will appreciate that the sawtooth filter implementation of FIG. 13 is simply not achievable using current state of the art digital filters. FIG. 14 is an output spectrum of a filter designed to invert the sin(x)/x roll-off applied to the waveform shown in FIG. 9.

Of course, the equalizer LUT 182 may be populated with amplitude scaling factors for generating any desired spectral output. Accordingly, the present invention may be employed to implement filter transfer functions that would otherwise be difficult, or impossible, to realize using conventional techniques.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A method for equalizing a radio frequency (RF) waveform in a communication system, the method comprising:
    generating a digital waveform at a predetermined instantaneous frequency with a DDS;
    providing a digital instantaneous frequency signal corresponding to the predetermined instantaneous frequency;
    retrieving a predetermined digital scaling factor corresponding to the predetermined instantaneous frequency; and
    multiplying the digital waveform by the digital scaling factor to yield an equalized DDS waveform.

2. The method of claim 1, further comprising the step of converting the equalized DDS waveform into an equalized analog waveform via a digital-to-analog converter (DAC).

3. The method of claim 2, wherein the digital scaling factor is retrieved from a look-up table (LUT), the LUT including a plurality of digital scaling factors, each of the plurality of digital scaling factors being indexed as a function of instantaneous frequency.

4. The method of claim 3, wherein the plurality of digital scaling factors comprise a predetermined digital filter transfer function.

5. The method of claim 4, wherein the digital filter transfer function includes an inverse sin (x)/x function.

6. The method of claim 4, wherein the digital filter transfer function is configured to pre-distort a generated waveform to substantially eliminate analog distortions induced by RF components disposed downstream of the DAC.

7. The method of claim 1, further comprising:
selecting a modulation format for the RF waveform transmission;
determining a frequency response of the communication system based on the selected modulation format and a sampling rate of a communication system DAC, the frequency response including predetermined amplitude roll off characteristics as a function of frequency;
calculating a plurality of scaling factors as a function of frequency, the plurality of digital scaling factors comprising a predetermined digital filter transfer function, the predetermined digital filter transfer function being an inversion of the frequency response; and
populating an LUT with the plurality of scaling factors, the plurality of scaling factors being indexed as a function of digital instantaneous frequency signal, whereby each of the plurality of scaling factors corresponds to one of a plurality of digital instantaneous frequency signals.

8. The method of claim 7, wherein the modulation format is selected from a group of modulation formats that includes amplitude, phase and/or frequency modulation formats.

9. The method of claim 7, wherein the plurality of digital scaling factors comprise a predetermined digital filter transfer function.

10. The method of claim 9, wherein the digital filter transfer function includes an inverse sin (x)/x function.

11. The method of claim 9, wherein the digital filter transfer function is configured to pre-distort a generated waveform to substantially eliminate analog distortions induced by RF components disposed downstream of the DAC.

12. The method of claim 1, further comprising:
monitoring the RF waveform;
comparing selected waveform characteristics of the RF waveform to predetermined waveform characteristics to determine an error signal;
calculating a plurality of digital scaling factors as a function of frequency, the plurality of digital scaling factors comprising a predetermined digital filter transfer function, the predetermined digital filter transfer function being configured to eliminate the error signal; and
populating an LUT with the plurality of digital scaling factors, the plurality of digital scaling factors being indexed as a function of digital instantaneous frequency signal, whereby each of the plurality of scaling factors corresponds to one of a plurality of digital instantaneous frequency signals.

13. The method of claim 1, wherein the step of generating a DDS waveform at a predetermined instantaneous frequency includes:
selecting the predetermined instantaneous frequency from a plurality of predetermined instantaneous frequencies in accordance with a predetermined modulation format;
generating a sequence of phase signals, the sequence of phase signals corresponding to the advancing phase of a sine function having a frequency equal to the selected predetermined instantaneous frequency; and
converting each phase signal in the sequence of phase signals into a corresponding amplitude of the sine function to generate a series of amplitudes in a sequence corresponding to the advancing phase of the sine function.

14. The method of claim 13, wherein the step of multiplying includes multiplying each amplitude in the series of amplitudes by the digital scaling factor corresponding to the predetermined digital instantaneous frequency.

15. The method of claim 13, wherein the sequence of phase signals continuously increments with each system clock signal applied thereto.

16. A system comprising:
a digital waveform generator configured to generate a DDS waveform in response to a predetermined instantaneous frequency input;
a programmable equalizer coupled to the digital waveform generator, the equalizer being configured to selectively provide a predetermined digital scaling factor in response to the predetermined instantaneous frequency input; and
a multiplier coupled to the equalizer, the multiplier being configured to multiply the DDS waveform by the digital scaling factor to yield an equalized DDS waveform.

17. The system of claim 16, wherein the programmable equalizer includes a plurality of scaling factors stored therein, the plurality of scaling factors being indexed as a function of digital instantaneous frequency signal, each of the plurality of scaling factors corresponding to one of a plurality of digital instantaneous frequency signals.

18. The system of claim 17, wherein the programmable equalizer includes a look-up table (LUT), the LUT being configured to index the plurality of digital scaling factors as a function of frequency.

19. The system of claim 18, wherein the plurality of digital scaling factors comprise a predetermined digital filter transfer function.

20. The system of claim 19, wherein the digital filter transfer function includes an inverse sin (x)/x function.

21. The system of claim 19, wherein the digital filter transfer function is configured to pre-distort a generated waveform to substantially eliminate analog distortions induced by RF components downstream of the multiplier.

22. The system of claim 16, wherein the digital waveform generator further comprises:
a frequency accumulator configured to select the predetermined instantaneous frequency from a plurality of predetermined instantaneous frequencies in accordance with a predetermined modulation format;
a phase accumulator coupled to the output of the frequency accumulator, the phase accumulator being configured to generate a sequence of phase signals, the sequence of phase signals corresponding to an advancing phase of a sine function having a frequency equal to the selected predetermined instantaneous frequency; and
at least one conversion look up table (LUT) coupled to the phase accumulator, the conversion LUT having stored therein a series of amplitude values indexed as a function of the series of phase signals, the conversion LUT outputting one amplitude value in response to a corresponding phase signal to thereby generate a series of amplitudes in a sequence corresponding to the advancing phase of the sine function.

23. The system of claim 22, wherein the multiplier multiplies each amplitude in the series of amplitudes by the digital scaling factor.

24. The system of claim 22, wherein the frequency accumulator continuously increments the sequence of instantaneous frequency signals in accordance with system clock signals applied thereto, wherein the DDS generates a frequency modulated waveform.

25. The system of claim 22, wherein the phase accumulator continuously increments the sequence of phase signals with each system clock signal applied thereto.

26. The system of claim 22, wherein the at least one conversion look up table (LUT) includes a cosine conversion LUT disposed in parallel with a sine conversion LUT, the cosine conversion LUT having stored therein a series of cosine amplitude values indexed as a function of the series of phase signals and the sine conversion LUT having stored therein a series of sine amplitude values indexed as a function of the series of phase signals.

27. The system of claim 26, wherein each amplitude in the series of cosine amplitude values is multiplied by the digital scaling factor to generate an equalized in-phase digital signal and each amplitude in the series of sine amplitude values is multiplied by the digital scaling factor to generate an equalized quadrature-phase digital signal.

28. The system of claim 22, wherein the digital waveform generator, the programmable equalizer, and the multiplier are disposed in an integrated circuit.

29. The system of claim 28, wherein the integrated circuit is an FPGA.

30. The system of claim 28, wherein the integrated circuit is an ASIC.

31. The system of claim 22, wherein the digital waveform generator, the programmable equalizer, and the multiplier are implemented in software.

32. The system of claim 16, wherein the system is selected from a group of systems that include an agile local oscillator frequency synthesizer, a programmable clock generator, an FM chirp source, an automotive radar system, a test and measurement equipment, an acousto-optic device driver, an RF exciter, or an ultrasound waveform generator.

33. The system of claim 16, further comprising a DAC coupled to the output of the multiplier, the DAC being configured to convert the equalized DDS waveform into an equalized analog waveform.

34. A radar system comprising:
a waveform generator including the system of claim 22, the waveform generator being configured to provide a modulated system transmit waveform;
a local oscillator (LO) coupled to the waveform generator by a synchronizing signal, the LO including the system of claim 22, the LO being configured to provide an LO signal; and
an upconverter coupled to the waveform generator and the LO, the upconverter being configured to multiply the system transmit waveform by the LO signal to generate a transmit drive signal.

35. The system of claim 34, wherein the transmit drive signal is a UHF radar output signal.

36. The system of claim 35, further comprising:
an RF amplifier coupled to the upconverter; and
an antenna coupled to the RF amplifier.

37. The system of claim 34, further comprising a control system programmed to:
select a modulation format for the RF waveform transmission;
determine a frequency response of the communication system based on the selected modulation format and a sampling rate of a communication system DAC, the frequency response including predetermined amplitude roll off characteristics as a function of frequency;
calculate a plurality of scaling factors as a function of frequency, the plurality of digital scaling factors comprising a predetermined digital filter transfer function, the predetermined digital filter transfer function being an inversion of the frequency response; and
populate an LUT in the waveform generator, and LO with the plurality of scaling factors, the plurality of scaling factors being indexed as a function of digital instantaneous frequency signal, whereby each of the plurality of scaling factors corresponds to one of a plurality of digital instantaneous frequency signals.

38. The system of claim 37, wherein the modulation format is selected from a group of modulation formats that includes amplitude modulation, frequency modulation, and/or phase modulation formats.

39. The system of claim 38, wherein the plurality of digital scaling factors comprise a predetermined digital filter transfer function.

40. The system of claim 39, wherein the digital filter transfer function includes an inverse sin (x)/x function.

41. The system of claim 39, wherein the digital filter transfer function is configured to pre-distort a generated waveform to substantially eliminate analog distortions induced by RF components downstream of a DAC.

42. The system of claim 34, further comprising a control system programmed to:
monitor an RF waveform transmitted by the radar system;
compare selected waveform characteristics of the RF waveform to predetermined waveform characteristics to determine an error signal;
calculate a plurality of scaling factors as a function of frequency, the plurality of digital scaling factors comprising a predetermined digital filter transfer function, the predetermined digital filter transfer function being configured to eliminate the error signal; and
populate an LUT with the plurality of scaling factors, the plurality of scaling factors being indexed as a function of digital instantaneous frequency signal, whereby each of the plurality of scaling factors corresponds to one of a plurality of digital instantaneous frequency signals.

43. The system of claim 16, further comprising an amplitude shaping device coupled to the programmable equalizer, the amplitude shaping device generating a digital amplitude shaping word calculated to shape the rising edge of the equalized DDS waveform.

44. The system of claim 43, further comprising a second multiplier configured to multiply the equalized DDS waveform by the digital amplitude shaping word.

* * * * *